A. H. PRENZEL.

SHOE.

APPLICATION FILED JUNE 8, 1911.

Reissued July 23, 1912. 13,448.

WITNESSES:

Elizabeth C. Cope

C. Blanche Hargraves.

INVENTOR.

Adam Henry Prenzel

By his Attorney

Nelson W. Howard

UNITED STATES PATENT OFFICE.

ADAM HENRY PRENZEL, OF HALIFAX, PENNSYLVANIA, ASSIGNOR TO UNITED SHOE MACHINERY COMPANY, OF PATERSON, NEW JERSEY, A CORPORATION OF NEW JERSEY.

SHOE.

13,448. Specification of Reissued Letters Patent. Reissued July 23, 1912.

Original No. 967,053, dated August 9, 1910, Serial No. 504,276. Application for reissue filed June 8, 1911. Serial No. 632,100.

*To all whom it may concern:*

Be it known that I, ADAM HENRY PRENZEL, a citizen of the United States, residing at Halifax, in the county of Dauphin and State of Pennsylvania, have invented new and useful Improvements in Shoes, of which the following is a specification.

This invention relates to improvements in shoes and is more particularly applicable to those shoes designed for the use of children in which a wedge is inserted under the heel seat to raise the heel while at the same time preserving the continuity of the bottom from the front to the extreme rear.

The usual manner of constructing a shoe of the type mentioned is to take a continuous piece of leather forming the sole and heel portions and sew the upper to the sole portion. A heel seat is then placed inside the shoe and a wedge is placed above the heel proper. That portion of the upper above the heel is fastened to the heel seat by tacking. The heel thus constructed is nailed in the usual manner. This method has one great disadvantage, namely, that it requires hand labor to insert and tack down the heel seat. Furthermore, the front edge of the heel seat forms a raised ridge which requires the insertion of a leveling strip on the inside of the shoe in order to give a smooth surface for the finished shoe.

An object of my invention is to provide a shoe in which the heel seat is secured by sewing it to the upper by a machine, thus doing away with the manual labor required when the heel seat is tacked in.

A further object of my invention is to provide a shoe with a smooth surface on the inner as well as the outer sides of the sole and heel portions, thus eliminating the necessity of a leveling strip on the inside of the shoe.

A further object is to construct a shoe in such a manner that the upper can be secured to the heel portion at any desired distance from the edge by merely beveling the edge of the heel seat at the proper angle.

Other objects and advantages will appear from the following specification and the novel features will be particularly pointed out in the appended claims.

My invention is illustrated in the accompanying drawings in which,—

Figure 1:
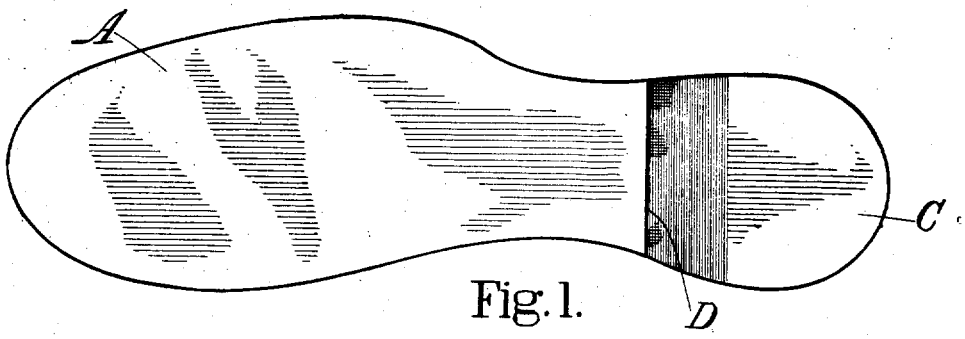
Figure 2:
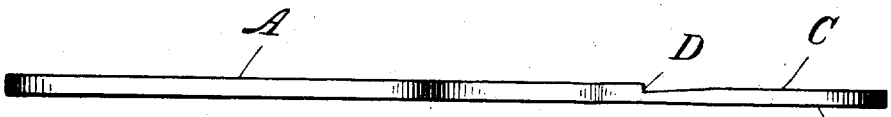
Figure 4:
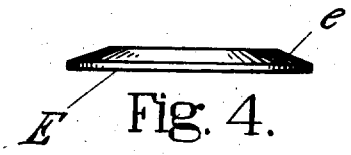
Figure 3:
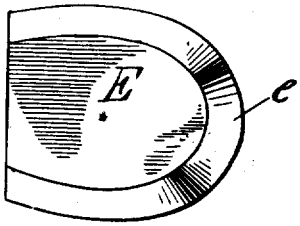
Figure 5:
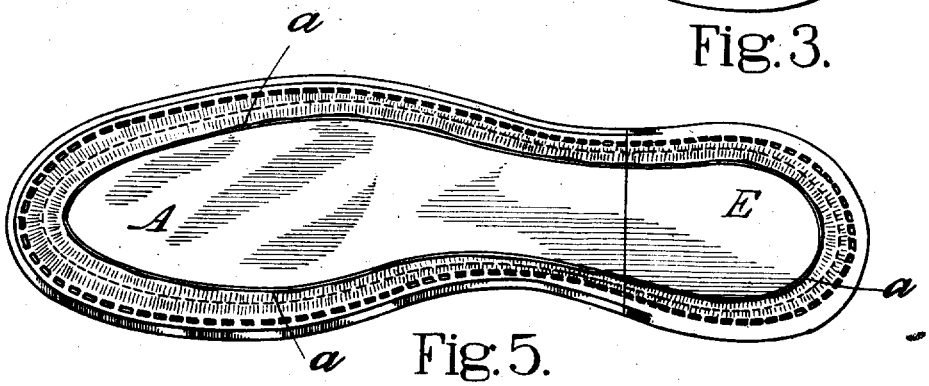
Figure 6:
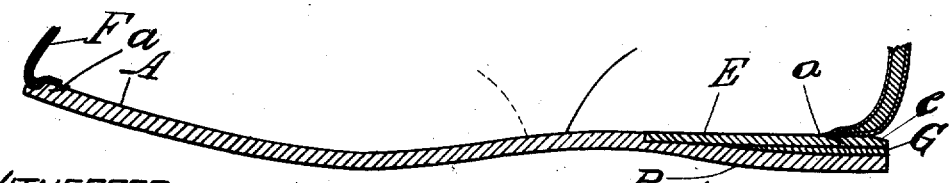

Figure 1 is a plan view of the bottom piece showing the sole and recessed heel portion; Fig. 2 is an edge view of the parts shown in Fig. 1; Fig. 3 is a plan view of the beveled heel seat; Fig. 4 is an edge view of the heel seat; Fig. 5 is a plan view of the channeled sole and heel seat; and Fig. 6 is a central vertical section of the bottom portion of a finished shoe.

In carrying out my invention, I provide a bottom piece of the shape shown in Fig. 1 having the sole portion A and the heel portion B. I recess the heel portion slightly at C and toward the inner end of the heel portion I make the recess deeper as shown at D. The recessing of the heel portion is done on a machine. The heel seat E is beveled around its outer edge in the manner shown at *e* in Figs. 3 and 4. It is then placed in the recessed portion C D prepared for it and is glued temporarily in place. The piece thus formed is channeled as at *a* by a channeling machine, the heel seat E being treated in the same manner as the sole portion A, as shown in Fig. 5, except that the shoulder formed upon the outer edge of the sole portion is not extended around the heel seat, the bevel *e* serving the purposes of the shoulder in sewing the upper to the heel seat. The upper F, which is turned inside out, is now sewed both to the sole and to the heel seat, this being effected by one operation. The upper is now turned back, the heel seat separated from the heel portion B to which it was temporarily glued, and the wedge G inserted between the heel seat and the heel. The heel thus formed is nailed in the usual manner.

It will be seen that with this process, the hand labor involved in tacking in the heel seat is avoided. Both the inside and outside of the bottom form smooth, continuous surfaces, as clearly shown in Fig. 5.

The upper may be secured close to the edge of the heel seat or farther away from the edge by varying the angle and extent of the beveled edge *e* and sewing the upper accordingly, the beveled edge serving to set the upper away from the heel seat.

The recess C D in the heel as well as the heel seat E may be varied as to size or shape to suit occasion without departing in the least from the spirit of the invention.

Having described my invention, what I claim as new and desire to secure by Letters Patent of the United States is:—

1. In a shoe, a bottom having a body portion and a heel portion, said heel portion being provided with a recess on its upper side and being bent downwardly and rearwardly, a heel seat having its forward edge disposed in said recess, the top of the heel seat being flush with the top of the bottom piece at their contacting portions, the body portion of said bottom and the heel seat being provided with a continuous line of channeling, an upper, a continuous row of stitching extending along said channeled line for securing the upper to the body portion of the bottom and to the heel seat, and a wedge secured between the heel portion of said bottom and said heel seat.

2. In a shoe, a bottom having a body portion and a heel portion, said heel portion being provided with a recess on its upper side and being bent downwardly and rearwardly, a heel seat having its forward edge disposed in said recess, said heel seat and the body portion of said bottom being provided with a continuous line of channeling, an upper, a continuous row of stitching extending along said channeled line for securing the upper to the body portion of the bottom and to the heel seat, and a wedge secured between the heel portion of said bottom and said heel seat.

3. In a shoe, a bottom having a body portion and a heel portion, said heel portion being provided with a recess on its upper side, a heel seat having its forward edge disposed in said recess, the top of the heel seat being substantially flush with the upper surface of the bottom piece along their contacting edges, the upper side of the body portion of sa bottom and the upper side of the heel seat being provided with a continuous line of channeling, a continuous row of stitching along the line of channeling for securing said upper to said bottom piece and to said heel seat, and a wedge secured between said heel portion of the bottom and said heel seat.

4. A shoe, comprising a sole provided with a recess in the heel portion thereof, a heel seat having its forward edge disposed in said recess, the upper surfaces of said sole and said heel seat being substantially flush at the line of junction and having formed in them a continuous sewing channel which extends from the sole into the heel seat, an upper, a continuous row of stitching following the channel for securing the upper to the sole and to the heel seat, and a wedge secured between the heel portion of the sole and the heel seat.

5. A shoe, comprising a sole provided with a recess in the heel portion thereof, a heel seat having its forward edge disposed in said recess, the upper surfaces of said sole and said heel seat being substantially flush at the line of junction and having formed in them a continuous sewing channel which extends from the sole into the heel seat, said heel seat being of such thickness and form that it will carry the sewing channel from substantially said line of junction, an upper, a continuous row of stitching following the sewing channel for securing the upper to the sole and to the heel seat, and a wedge secured between the heel portion of the sole and the heel seat.

In testimony whereof I have signed my name to the specification in the presence of two subscribing witnesses.

ADAM HENRY PRENZEL.

Witnesses:

LUTHER W. RYAN,
GEORGE W. SHULTZ.